Jan. 15, 1963 R. L. DEGA 3,073,033
DEVICE AND METHOD FOR GAUGING THE ECCENTRICITY OF AN ANNULAR SEAL
Filed April 1, 1960

INVENTOR.
Robert L. Dega
BY
C. P. Barnard
ATTORNEY

United States Patent Office 3,073,033
Patented Jan. 15, 1963

3,073,033
DEVICE AND METHOD FOR GAUGING THE ECCENTRICITY OF AN ANNULAR SEAL
Robert L. Dega, Utica, Mich., assignor to General Motors Corporation, Detroit, Mich., a corporation of Delaware
Filed Apr. 1, 1960, Ser. No. 19,297
4 Claims. (Cl. 33—174)

This invention relates to gauging devices and, more particularly, to a gauge adapted for checking the concentricity of annular seals of the type having a flexible sealing lip for sealing engagement with a cylindrical shaft-like member.

An object of this invention is to provide a gauge so constructed and arranged that the test seals may be easily and quickly placed in position for checking.

Another object of this invention is to provide a gauge device and method for supporting an annular resilient test member in a manner closely assimilating actual working conditions and without introducing extraneous deformations which would alter the true eccentricity reading of the test piece.

A further object of this device is to provide gauge mechanism having a test piece assembly tool which eliminates undesired forced application to the test member during assembly on the gauging device.

Still another object of this invention is to provide support means for the periphery of a resilient test member which enables accurate eccentricity measurement.

Other objects and advantages of the invention will be understood by reference to the following detailed description and the accompanying drawing, in which.

Figure 1:
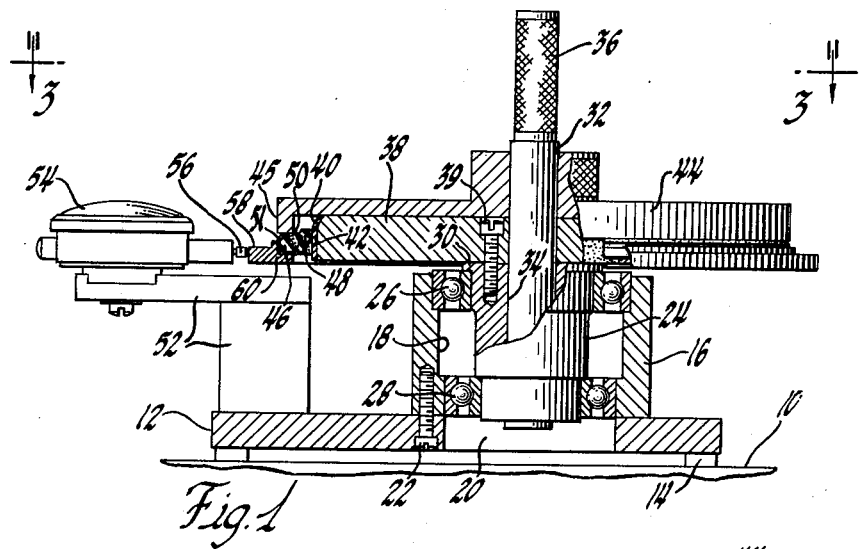
FIGURE 1 is a side elevational view partly in section of the illustrative embodiment of this invention.

Referring now to the drawing, a work table 10 is provided to support a gauge base plate 12 on a plurality of rest buttons 14. A hub 16 having a central bore 18 is fastened concentrically about a hole 20 in the plate 12 by suitable fastening means such as bolts 22. A sleeve 24 is rotatably supported within the central bore by bearing members 26, 28 of different diameters. A radially extending flange 30 is provided on the upper end of the sleeve 24 to form a seat for the larger diameter bearing 26 and the other end of the sleeve is reduced in diameter to form a seat for the bearing 28. A drive shaft 32 has one end fixedly secured within a central bore 34 of the sleeve 24 by an interference fit or other suitable fastening means, and the other end of the shaft is provided with a knurled handle 36 for rotation of the shaft and the sleeve on the bearing members 26, 28 within the hub. A test seal supporting wheel 38 is mounted about the handle and secured to the sleeve 24 by a plurality of bolts 39 or other suitable fastening means. The wheel 38 is cylindrical in shape and is made to simulate shafts on which the seals to be tested are adapted to be used, i.e., the outside diameter of the wheel is equal to the outside diameter of the shaft on which the seal is to be mounted in use. The wheel is provided with a beveled edge 40 and has a coating of Teflon 42 or other suitable frictionless material for a purpose to be hereinafter described. A mounting or assembly tool 44 is slidably removably supported on the shaft and is provided with an axially extending annular rim 45 which is radially outwardly spaced from the outer periphery of the arbor for engagement with the side surface of a resilient seal.

Figure 2:
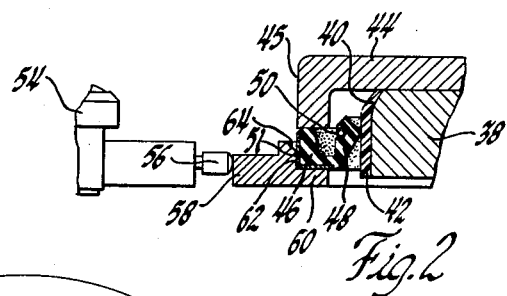
FIGURE 2 is a detail sectional view of a portion of the device shown in FIGURE 1.
Figure 3:
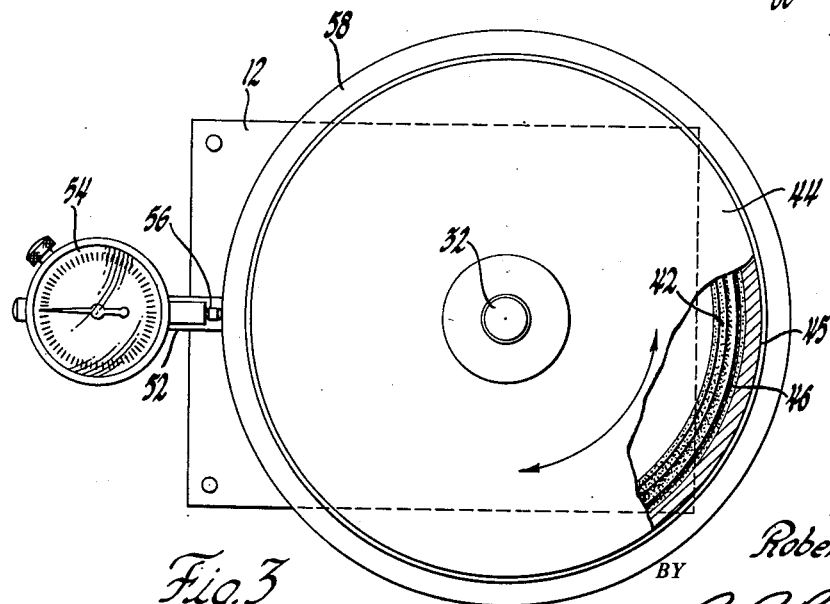
FIGURE 3 is a top view taken along the line 3—3 in FIGURE 1.

As shown in FIGURE 2 the seal members to be tested comprise generally an annular ring of resilient material having a body portion 46 and a radially inwardly extending flexible lip portion 48 which seats a garter spring 50. It is possible that this apparatus could be adapted for testing annular seals which have radially outwardly extending flexible lips rather than radially inwardly extending flexible lips by a reversal of parts; but the most common type of seal to be tested is the latter and the apparatus has particular features in relation thereto. In addition, some types of seals adapted for checking on the described apparatus are provided with a metallic casing 51.

A gauge bracket 52 is suitably secured to the base plate and supports a conventional precision dial indicator 54 upwardly outwardly therefrom so that the measuring probe 56 may be positioned in engagement with the outer peripheral surface of the test seal or with the outer peripheral surface of a measuring and support ring 58. If the test seal has sufficient rigidity the probe may be engaged directly with its outer surface. However, in many applications the test seal will be insufficiently rigid to permit accurate gauging by direct engagement of the probe with the seal body. In these cases we provide a unique device permitting accurate measuring of the eccentricity of the seal by means of the measuring and support ring 58 which provides a peripheral surface for engagement with the measuring probe and which serves to laterally support the test seal and "round" the test seal out for accurate measurement. Since the apparatus gauges the eccentricity of a circle defined by the outside diameter of the seal relative to a circle defined by the inside diameter of the seal, the measuring and support ring may be utilized to maintain the outside diameter of the seal in a circular shape without affecting the eccentricity measurement. As illustrated in FIGURE 2, the measuring and support ring is provided with a radially inwardly extending flange portion 60 that is engageable with the side surface of the test seal body and an annular seat portion 62 which rests in intimate engagement with the outer peripheral surface of the test seal. The outer portion 64 of the seat 62 is tapered to facilitate assembly of test seals onto the seat portion 62. The ring 58 may be made from an aluminum ring or other suitable material. The other side surface of the test seal is left free to accommodate the side surface of the assembly tool 44 during the assembly operation.

In operation, the test fixture may be used to gauge the eccentricity of all of the seals to be used or may be used to randomly sample test seals to determine if specified standards are being met in production. In most applications it is desirable to check each seal before it is installed because the sealing ability thereof is directly related to the eccentricity of the outer peripheral surface of the body portion relative to the inner peripheral surface of the annular flexible sealing lip. In order to test the eccentricity of a particular size seal, a specially dimensioned testing unit including a seal supporting wheel, an assembly tool and a measuring and support ring are required. Thus for a particular test, a wheel 38 of particular diameter equal to the diameter of the shaft on which the seal is to be mounted in actual use is secured to the sleeve member 24 for rotation by the drive shaft 32. The test apparatus is therefore adapted for convenient changeover to any size wheel to test sealing members having various diameters. For each seal a particular measuring and support ring 58, if necessary, will be dimensioned in accordance with the outer diameter of the test seal and an assembly tool 44 will be dimensioned to engage the outer side surface of the body portion 46 of the test seal. Each of the seal supporting wheels 38 are coated with Teflon to facilitate assembly of the test seals. In addition, we have found that better results are obtained if we further lubricate the Teflon surface with a suitable lubricant. The Teflon coating and the lubricant are provided to reduce friction between the resilient sealing lip 48 and the support wheel 38 during the assembly operation because the inner diameter of the flexible lip is somewhat smaller than the outer diameter of the support wheel. If the frictional resistance between the two surfaces is not substantially eliminated the frictional drag otherwise created during the assembly operation introduces eccentricity deviations which are not reflective of the true eccentricity relationship between the outer peripheral surface and the inner peripheral surface of the flexible lip when the seal is properly seated and has a substantially lineal engagement with the flexible lip. The beveled edge 49 of the wheel 38 further facilitates concentric assembly of the test seal. If no measuring and support ring is necessary the test seal is placed on the wheel about the tapered surface 40 and the assembly tool 44 is then mounted on the drive shaft 32 and the tool 44 is brought into engagement with the side surface of the body portion 46 of the seal. The seal is then forced onto the wheel around the beveled portion by axial movement of the assembly tool 44 on the drive shaft and by axial application of force through the rim against the body portion of the seal. In this manner only axial forces are utilized in the assembly operation to further assure that the true eccentricity relationship between the outer periphery of the body portion and the inner periphery of the flexible lip is maintained. If radial forces are introduced in the assembly of the test seal the true eccentricity relationship is often disturbed and accurate readings are then unattainable. When a measuring and support ring is used the test seal is first assembled within the ring and then the assembly is positioned about the beveled portion of the wheel and assembled thereon in the afore-described manner. When the ring and test seal assembly is positioned upon the support wheel, the measuring probe of the gauge is brought into engagement with the outer periphery thereof and the assembly tool 44 is removed so that there will be no radial friction on the seal and the lip portion thereof will tend to assume its manufactured center. The drive shaft is then rotated to rotate the support wheel and the test seal past the gauge probe. Variations in eccentricity are measured by radial displacement of the measuring probe due to radial variations in the outer periphery of the test seal transmitted directly to the test probe or through the measuring and support ring.

Certain changes and modifications may be made in the details of construction and arrangement of the parts without departing from the spirit of this invention, as defined by the appended claims.

I claim:

1. Apparatus for measuring the eccentricity of an annular shaft seal adapted to be installed on a shaft and having an annular body portion and an annular flexible lip portion, said lip portion characterized by having an installed diameter larger than the uninstalled diameter, said apparatus comprising; a seal supporting cylinder having a seal lip receiving surface of a diameter equal to the outside diameter of a shaft on which the seal is to be mounted in use, a shaft drivingly associated with said seal supporting cylinder, a support member rotatably supporting said seal supporting cylinder, a measuring ring surrounding the annular body portion of said seal and carried thereby, said measuring ring adapted to circularize said annular body portion in cooperation with said cylinder, and gauge means mounted adjacent said supporting cylinder and in contact with said measuring ring whereby the eccentricity of the outer peripheral surface of said body portion relative to the inner peripheral surface of said annular flexible lip portion in the installed condition is determined.

2. The device as described in claim 1 and in addition comprising a seal assembly tool reciprocally supported on said shaft, said assembly tool having a rim portion axially engageable with the side surface of said body portion to position said annular seal evenly on said lip receiving surface.

3. An apparatus for measuring eccentricity of an annular shaft seal adapted to be installed on a shaft and having an annular body portion and an annular flexible lip portion, said lip portion characterized by having an installed diameter larger than the uninstalled diameter, said apparatus comprising: a seal supporting wheel having a seal lip receiving surface of a diameter equal to the outside diameter of a shaft on which the seal is to be mounted in use, said lip receiving surface being covered with a plastic material to facilitate seal assembly, a shaft drivingly associated with said seal supporting wheel, an assembly tool reciprocally mounted on said shaft and having a rim portion axially engageable with a side surface of said body portion to position said seal evenly on said lip receiving surface, a measuring ring surrounding said body portion and supported thereby, said measuring ring adapted to circularize said body portion in cooperation with said wheel, and gauge means mounted adjacent said wheel and contacting said measuring ring whereby upon rotation of said wheel the relative eccentricity between the outer peripheral surface of said body portion and the inner peripheral surface of said lip portion when in the installed condition is determined.

4. A method of measuring the eccentricity of annular shaft seals having a body portion and a flexible lip portion comprising the steps of, placing a seal over a rotatable test fixture having a circularly cylindrical lip receiving surface of a diameter equal to the diameter of a shaft on which the seal is to be used, circularizing the seal body portion with another test fixture having an annular configuration with an inner diameter substantially equal to the diameter of the seal outer periphery and being rotatable with the seal, rotating the seal by rotating the first named test fixture, and gauging the amount of eccentricity between the flexible lip and outer periphery of the seal as reflected by the radial linear movement of said second named test fixture relative to the rotational axis.

References Cited in the file of this patent
UNITED STATES PATENTS

| | | |
|---|---|---|
| 2,636,379 | Van Dorn | Apr. 28, 1953 |
| 2,656,818 | Moore | Oct. 27, 1953 |
| 2,929,147 | Hall | Mar. 22, 1960 |